(12) United States Patent
Grimm et al.

(10) Patent No.: US 6,390,541 B2
(45) Date of Patent: May 21, 2002

(54) SUN VISOR ARRANGEMENT AT A MOTOR VEHICLE ROOF MODULE

(75) Inventors: Rainer Grimm; Horst Böhm, both of Frankfurt (DE)

(73) Assignee: Meritor Automotive GmbH, Frankfurt (DE)

( * ) Notice: Subject to any disclaimer, the term of this patent is extended or adjusted under 35 U.S.C. 154(b) by 0 days.

(21) Appl. No.: 09/730,903

(22) Filed: Dec. 6, 2000

(30) Foreign Application Priority Data

Dec. 11, 1999 (DE) .......................... 199 59 812

(51) Int. Cl.[7] .............................. B62D 25/06
(52) U.S. Cl. .................. 296/214; 296/39.1; 296/97.9; 296/210
(58) Field of Search ................. 296/210, 214, 296/97.9, 39.1

(56) References Cited

U.S. PATENT DOCUMENTS 6,318,797 B1 * 11/2001 Bohm et al. ............... 296/210

FOREIGN PATENT DOCUMENTS

DE 19709016 A1 10/1998

* cited by examiner

*Primary Examiner*—Joseph D. Pape
*Assistant Examiner*—Lori L. Coletta
(74) *Attorney, Agent, or Firm*—Carlson, Gaskey & Olds

(57) ABSTRACT

A sun visor arrangement is proposed whose bearing elements, consisting of a swivel/rotary bearing and a removable swivel bearing, are foamed into or onto an inner shell, formed from a foamed plastics material, of a motor vehicle roof module with their component parts on the roof side at the same time as the inner shell is foam molded, so that the sun visors can be preassembled at the inner shell of the roof module, wherein the swivel/rotary bearing is constructed for fastening the sun visors and the inner shell to a body frame.

10 Claims, 2 Drawing Sheets

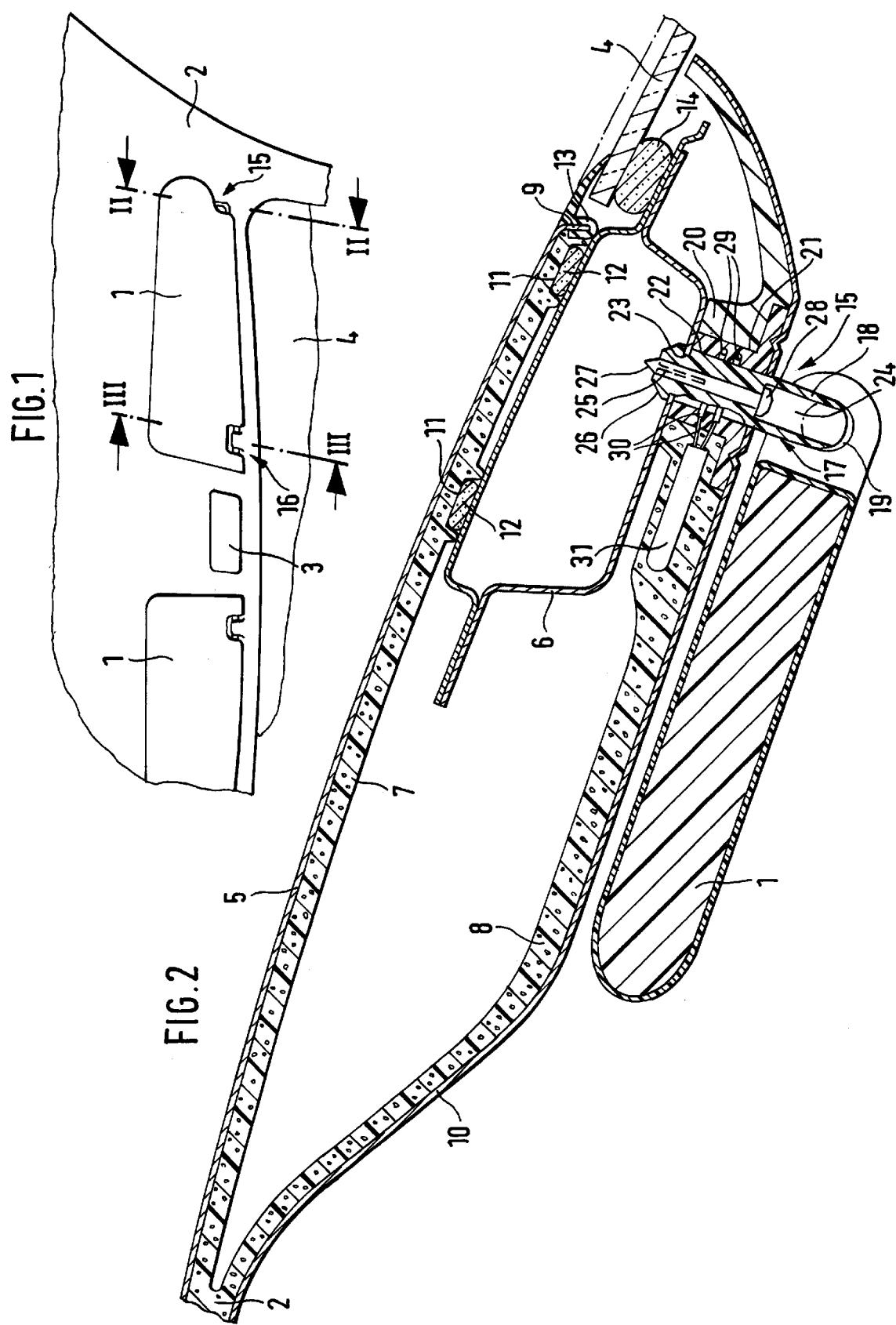

SUN VISOR ARRANGEMENT AT A MOTOR VEHICLE ROOF MODULE

BRIEF DESCRIPTION OF THE PRIOR ART

The invention relates to a sun visor arrangement at a roof module for motor vehicles.

Such vehicle roofs which are prefabricated in modular fashion so as to be ready to fit are completed separately from the vehicle body and only joined to the vehicle body in the automobile factory assembly line. Vehicle roof modules of this kind are gaining in importance in particular on account of the substantial reduction of assembly time in the assembly line.

Roof modules having functional elements already preassembled at the inner shell of the roof module are of particular advantage in this respect. The bottom layer, which can be bent downwards, of the inner shell of a known vehicle roof (DE 197 09 016 A1) is provided with preassembled functional elements, for example sun visors, at locations appropriate for this purpose. In this case the bearing elements for the sun visors are constructed as swivel bearing pedestals which are locked into corresponding recesses in the bottom layer and, optionally, the covering material of the inside roof lining, so that the sun visors can be preassembled at the inner shell. Once the body frame has been covered, fastening screws are screwed through the swivel bearing pedestals into the front cross member of the body frame, thereby fastening the sun visors and, in the region of the latter, also the bottom layer of the inner shell to the body frame.

SUMMARY OF THE INVENTION

An object of the invention is to improve the preassembly possibilities for the sun visors at the inner shell even further and at the same time also to provide the possibility of rotation at each bearing element in addition to the swivelling mobility of the sun visors.

According to the present invention, there is provided a sun visor arrangement at a roof module for motor vehicles having a vehicle body and a body frame, which module, having an inner shell formed from a foamed plastics material, is produced separately from the vehicle body in sandwich fashion and constructed at its inner shell as an inner roof lining and can be laid by way of its outer edges on the body frame and firmly connected thereto, wherein the inner shell is divided in the region of its outer edges provided to lie on the body frame into a top layer and a bottom layer, the top layer of which can be laid on the body frame, while the bottom layer can be bent downwards and is constructed to cover the body frame, wherein the body frame has a front cross member and the bottom layer is provided in the region of the front cross member of the body frame with preassembled sun visors, which are fitted so as to swivel on bearing elements which are connected to the bottom layer, and wherein fastening means can be passed through the bearing elements, which fastening means fasten the bearing elements and the bottom layer to the front cross member of the body frame, and wherein a rotary bearing is foamed into the bottom layer of the inner shell as a bearing element for each sun visor, which bearing element is constructed to seat a bearing pin, to which the sun visor is connected in a swivelling fashion outside of the rotary bearing.

As a result of foaming in a rotary bearing for each sun visor in the foaming operation which produces the inner shell, this bearing point is already produced in the foaming operation, thereby simplifying preassembly of the sun visors and at the same time obtaining a degree of freedom of rotary motion for the sun visors. Preassembly at the inner shell essentially takes place by inserting the bearing pin, on which the sun visor is mounted so as to swivel, in the rotary bearing.

Two alternatives are proposed for producing the rotary bearing. According to one alternative, a bearing bush which is to be placed in the foaming mold is foamed in, this bush comprising a bearing bore for seating the bearing pin.

According to the other alternative, a bearing bore is made directly in the foamed plastics material by foaming around a mold mandrel corresponding to the bearing pin. In the foaming process applied here a relatively rigid foam, which is partially formed in the inner shell, is foamed around the mold mandrel, so that the bearing bore for the bearing pin is finished without requiring any subsequent treatment when removal from the mold and withdrawal of the mold mandrel take place. Foaming processes in which different foams can be formed for workpieces foamed in one piece are known per se.

A particularly simple method of fastening the sun visors preassembled at the inner shell to the front cross member of the body frame is by forming a circumferential groove in the bearing pin at its end which is remote from the sun visor for locking with the edge of a seating opening in the front cross member of the body frame, the opening diameter of which opening is smaller than the diameter of the bearing pin. These parts can be easily locked by appropriately adapting the fastening openings in the cross member to the bearing pin, while constructing the latter accordingly.

This locking action is facilitated by providing the bearing pin with an axial bore which is open on both sides, at its end which is remote from the sun visor with slots continuing as far as the axial bore and, at this end, with a circulating conical chamfer whose minimum diameter is smaller than the diameter of the seating opening, as the elastic deformability of the bearing pin end concerned in the locking operation is improved by the hollow construction of the bearing pin and the provision of slots. A locking pin or similar, which extends at least into the region of the bearing pin can be provided with slots and can be inserted in the axial bore from the end of the bearing pin facing the sun visor. Thus, the hollow construction of the bearing pin also enables the locking fastening to be secured by inserting the locking pin or a locking screw in the hollow bearing pin, so that the elastic deformability of the bearing pin end is practically cancelled.

The locking pin or locking screw can be fitted by forming the axial bore in the form of a stepped bore, with the region of the stepped bore adjacent to the sun visor, which is of a greater diameter, being adapted to seat a head of the locking pin or similar, which rests against the bore step when completely inserted in the axial bore. Thus, the locking pin or screw is located in a defined position in the bearing pin by using the step of the stepped bore in the bearing pin as a stop for the head of the locking pin or locking screw.

The bearing pin of the rotary bearing enables illuminated vanity mirrors which are fitted on the sun visor to be electrically connected by providing electrically conductive slip rings firmly fitted at the circumference of the bearing pin and electrically connected to electrical conductors. The lighting device of the vanity mirror located on the sun visor is connected, wherein after the bearing pin has been fitted, the slip rings are constantly in contact in the rotary bearing with sliding contacts, which extend into the bearing bore of the rotary bearing and the electrical leads of which are foamed into the inner shell. This connection is externally invisible.

If the outer of the two bearing points of the sun visor is in the form of a rotary bearing, the inner bearing point is a detachable swivel bearing, whereby the sun visor can be swivelled following detachment by means of the rotary bearing in the direction of the side window. The sun visor arrangement can also comprise a removable swivel bearing provided on the side of the sun visor remote from the bearing pin of the rotary bearing by a bearing projection profiled approximately in the shape of a C and produced during foaming of the inner shell and thus in one part, in which bearing projection a swivel bearing pin of the sun visor engages in a releasable manner transversely to the swivel axis. This bearing is foam-molded from the material of the actual inner shell and thus in one part and may also be reinforced by a reinforcement embedded in the bearing projection of the C-shaped profile.

BRIEF DESCRIPTION OF THE DRAWINGS

Further particulars of the invention are illustrated in detail in the following on the basis of the drawings representing an embodiment. In the drawings:

FIG. 1 is a broken-away interior view showing a sun visor arrangement in a perspective diagrammatic representation, FIG. 2 is a broken-away section through the rotary bearing according to the intersection line II—II in FIG. 1.

DESCRIPTION OF THE PREFERRED EMBODIMENT

Figure 3:
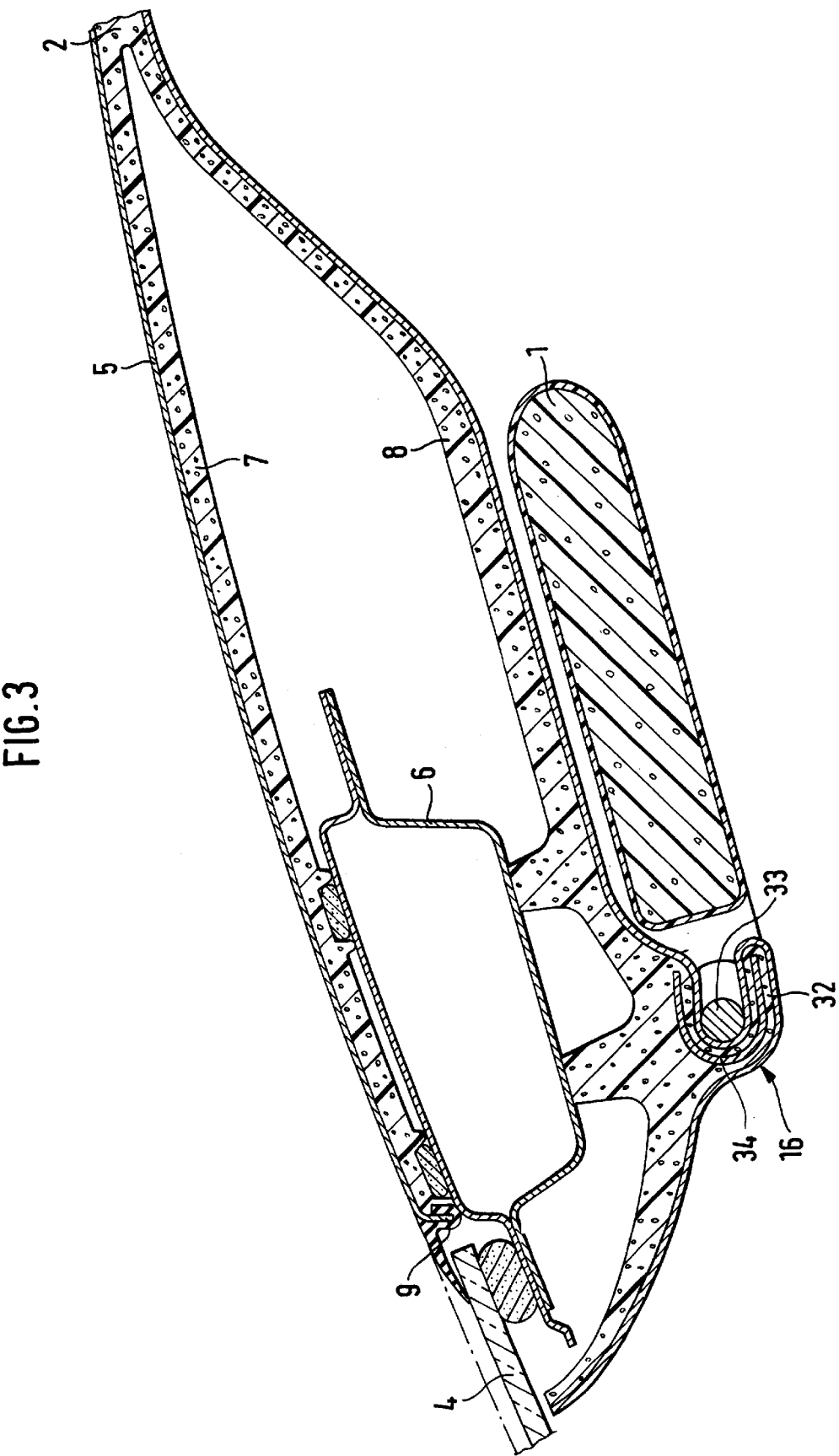
FIG. 3 is a broken-away section through the detachable swivel bearing according to the intersection line III—III in FIG. 1.

The sun visor arrangement which can be seen in FIG. 1 comprises two sun visors 1, which are fitted in a manner to be described so as to swivel and rotate on the inner shell 2 of the roof module on both sides of an interior light 3 above the windscreen 4.

In the illustrated embodiment the inner shell 2 of the roof module is made from a foamed plastics material which is foamed onto a rigid roof membrane 5. The rigid roof membrane 5 consists of a deep-drawn metal sheet, for example aluminium sheet, or it may be made from a vacuum-formed plastics sheet. However the invention may also be applied to roof module constructions which do not have a solid roof membrane. In the latter case the roof module consists essentially of a rigid foamed plastics material which is formed so as to be shell-shaped and inherently stiff and has a smooth outer surface which can be varnished.

The inner shell 2 is divided in the region of the outer edges provided to lie on the body frame 2 into two layers, the top layer 7 of which is laid on the body frame 6, while the bottom layer 8 projects beyond the outer edges of the vehicle roof and can be bent downwards without undergoing permanent deformation in order to pass through the body opening defined by the body frame 6. Only the front cross member of the body frame 6 is represented in FIGS. 2 and 3. The bottom layer 8 serves to cover the body frame and is provided in the region of the front cross member of the body frame 6 with the preassembled sun visors 1.

Suitable materials for the inner shell 2 are PUR-based rigid foamed plastics materials, which may be reinforced by fibrous substances, for example glass fibre lengths, which are incorporated with the plastics material before foaming. However woven and knitted fabrics, bonded fibre fabrics, etc. placed in the foaming mold are also suitable as reinforcement. The result of foaming on the reinforced inner shell 2, the top layer 7 of which extends as far as an edge fold 9 of the roof membrane 5, is a sandwich-like composite roof module of high dimensional stability and strength. All the contours of the inner shell 2, including the bottom layer 8 and its profiles, are produced by appropriate shaping of the foaming mold (not represented).

The inner surface of the inner shell 2 may be coated with a textile or sheet-like covering material 10 in order to form an inside roof lining. The top layer 7 is provided with seating grooves 11 worked in to extend in a circle in the region in which it lies on the body frame 6, in which grooves adhesive beads 12 are seated, these sealing off the roof module from the body frame 6 and fastening it thereto. A sealing profile 13, which rests in a sealing fashion against the outer surface of the windscreen 4 with an outward projecting lip, is fixed on the edge fold 9 and foamed on with the latter. A further adhesive bead 14 fastens the windscreen 4 to the vehicle body and seals it off from the latter between the windscreen 4 and an outward projecting flange of the front cross member of the body frame 6.

Each of the two sun visors 1 is connected in a swivelling manner to the bottom layer 8 of the inner shell 2 via two respective bearing elements. The respective outer bearing element 15 is a swivel and rotary bearing, while the respective inner bearing element 16 is a detachable swivel bearing. The outer bearing element 15 will firstly be illustrated in detail on the basis of the embodiment according to FIG. 2.

A two-limbed bearing pin 17 is provided in this case, the two limbs of which are oriented at an obtuse angle to one another and the limb 18 of these, which is oriented approximately perpendicularly to the bottom surface of the front cross member of the body frame 6, has the function of a rotary bearing, while the other limb 19, which is oriented approximately parallel to the front cross member, engages in the sun visor 1, which is mounted in swivelling fashion on this limb 19. In the illustrated example the rotary bearing for the limb 18 of the bearing pin 17 is a bearing bush 21, which is foamed into a thickened part 20 of the bottom layer 8 and the bearing bore 22 of which seats the limb 18 of the bearing pin 17 such that it can rotate.

Not only does the bearing pin 17 enable the sun visor 1 to be preassembled at the inner shell 2, to which the bearing element 16 contributes as will be described, but it also enables the sun visor 1 to be fastened to the front cross member of the body frame 6, with the bottom layer 8 being disposed in between. For this purpose the bearing pin 17 comprises at its end which is remote from the sun visor 1 a circumferential groove 23 for locking with the edge of a corresponding seating opening in the front cross member of the body frame 6. Here the diameter of the seating opening is smaller than the diameter of the bearing pin 17 or its limb 18. The bearing pin 17 is provided in the region of its limb 18 with an axial bore 24 which is open on both sides and has at its end which is remote from the sun visor 1 slots 25 continuing as far as the axial bore 24 and, at this end, a circulating conical chamfer 26 as an insertion aid when locking the bearing pin 17 in the seating opening in the cross member of the body frame 6. The minimum diameter of the conical chamfer is smaller than the diameter of the seating bore for this purpose.

A locking pin 27, which extends at least into the region of the limb 18 of the bearing pin 17 which is provided with slots 25, can be inserted in the axial bore 24 from the end of the bearing pin 17 facing the sun visor 1. The slots 25, together with the conical chamfer 26, guarantee resiliently elastic deformation when the bearing pin 17 locks into the seating opening in the body frame. After being fitted, the locking pin 27 prevents elastic deformation of the bearing pin 17 in the region of the seating opening and thereby ensures that the bearing pin 17 is locked to the front cross member of the body frame 6.

The axial bore 24 is in the form of a stepped bore, with the region of the stepped bore adjacent to the sun visor 1, which is of a greater diameter, being adapted to seat a head 28 of the locking pin 27, which rests against the bore step when completely inserted in the axial bore 24.

Electrically conductive slip rings 29 may be firmly fitted at the circumference of the limb 18 of the bearing pin 17 for the electrical connection of an illuminated vanity mirror (not represented) of the sun visor 1. The slip rings 29 are connected to electrical conductors (not represented), to which the lighting device of a vanity mirror located on the sun visor 1 is connected. After the bearing pin 17 has been fitted, the slip rings 29 in the rotary bearing 15 are constantly in contact with sliding contacts 30, which extend into the bearing bore 22 of the rotary bearing 15 and the electrical leads 31 of which are foamed into the thickened part 20 of the inner shell 2.

FIG. 3 will now be referred to in order to illustrate the inner bearing element 16. The bearing element 16, which is in the form of a removable swivel bearing, has a bearing projection 32 profiled approximately in the shape of a C. The bearing projection 32 is produced during foaming of the inner shell 2 and thus in one part. A swivel bearing pin 33 of the sun visor 1 engages in a releasable manner with the bearing projection 32 transversely to the swivel axis. The bearing projection 32 may initially be produced during the foaming operation as an element which projects downwards approximately in a straight fashion and can therefore be removed from the mold and the C-shape of which is subsequently produced by bending around a mold mandrel. The diameter of the latter is approximately the same as that of the swivel bearing pin 33. The bearing projection is bent into its illustrated shape when its foamed material is in a thermoplastic state. A metal reinforcement 34 may be embedded in the bearing projection 32 of C-shaped profile, this reinforcement also being given its illustrated shape in the described bending operation. The bearing projection 32 is bent such that the opening width of the C-profile is smaller than the diameter of the swivel bearing pin 33, so that the latter is locked to the bearing projection 32 in a releasable manner.

A sun visor arrangement is proposed whose bearing elements, consisting of a swivel/rotary bearing and a removable swivel bearing, are foamed into or onto an inner shell, formed from a foamed plastics material, of a motor vehicle roof module with their component parts on the roof side at the same time as the inner shell is foam molded, so that the sun visors can be preassembled at the inner shell of the roof module, wherein the swivel/rotary bearing is constructed for fastening the sun visors and the inner shell to a body frame.

It will be understood that the invention is capable of modification and therefore is not to be limited to the precise details set forth. Rather, various modifications may be made in the details within the scope and range of equivalents of the claims without departing from the spirit of the invention.

We claim:

1. A sun visor arrangement at a roof module for motor vehicles having a vehicle body and a body frame, which module, having an inner shell formed from a foamed plastics material, is produced separately from the vehicle body in sandwich fashion and constructed at its inner shell as an inner roof lining and can be laid by way of its outer edges on the body frame and firmly connected thereto, wherein the inner shell is divided in the region of its outer edges provided to lie on the body frame into a top layer and a bottom layer, the top layer of which can be laid on the body frame, while the bottom layer can be bent downwards and is constructed to cover the body frame, wherein the body frame has a front cross member and the bottom layer is provided in the region of the front cross member of the body frame with preassembled sun visors, which are fitted so as to swivel on bearing elements which are connected to the bottom layer, and wherein fastening means can be passed through the bearing elements, which fastening means fasten the bearing elements and the bottom layer to the front cross member of the body frame, and wherein a rotary bearing is foamed into the bottom layer of the inner shell as a bearing element for each sun visor, which bearing element is constructed to seat a bearing pin, to which the sun visor is connected in a swivelling fashion outside of the rotary bearing.

2. A sun visor arrangement according to claim 1, wherein the rotary bearing is formed by a foamed-in bearing bush, which has a bearing bore for seating the bearing pin.

3. A sun visor arrangement according to claim 1, wherein the rotary bearing is formed by foaming around a mold mandrel corresponding to the bearing pin with a rigid foam.

4. A sun visor arrangement according to claim 1, wherein the bearing pin comprises an end which is remote from the sun visor and has at that end a circumferential groove for locking with the edge of a seating opening in the front cross member of the body frame, the seating opening having a diameter which is smaller than the diameter of the bearing pin.

5. A sun visor arrangement according to claim 4, wherein the bearing pin is provided with an axial bore which is open on both sides, at its end which is remote from the sun visor with slots continuing as far as the axial bore and, at this end, with a circulating conical chamfer whose minimum diameter is smaller than the diameter of the seating opening.

6. A sun visor arrangement according to claim 5, wherein a locking pin, which extends at least into the region of the bearing pin which is provided with slots, can be inserted in the axial bore from the end of the bearing pin facing the sun visor.

7. A sun visor arrangement according to claim 6, wherein the locking pin has a head and the axial bore is in the form of a stepped bore, with the region of the stepped bore adjacent to the sun visor, which is of a greater diameter, being adapted to seat the head of the locking pin, which rests against the bore step when completely inserted in the axial bore.

8. A sun visor arrangement according to claim 1, wherein electrically conductive slip rings are securely fitted around the circumference of the bearing pin, the slip rings being connected to electric conductors, wherein after the bearing pin has been fitted, the slip rings in the pivot bearing remain in contact with sliding contacts, which extend into the bearing bore of the pivot bearing and the sliding contacts have electrical leads which are foamed into the inner shell.

9. A sun visor arrangement according to claim 1, wherein a removable swivel bearing is provided on the side of the sun visor remote from the bearing pin of the rotary bearing by a bearing projection of C-shaped profile and produced during foaming of the inner shell and thus in one part, in which bearing projection a swivel bearing pin of the sun visor engages in a releasable manner transversely to the swivel axis.

10. A sun visor arrangement according to claim 9, wherein a reinforcement is embedded in the bearing projection of C-shaped profile.

* * * * *